United States Patent
Sakuyama et al.

(10) Patent No.: US 7,409,095 B2
(45) Date of Patent: Aug. 5, 2008

(54) IMAGE PROCESSING APPARATUS AND METHOD FOR SCALABLE ENCODED IMAGE DATA

(75) Inventors: Hiroyuki Sakuyama, Tokyo (JP); Keiichi Ikebe, Kanagawa (JP); Takao Inoue, Kanagawa (JP); Shin Aoki, Kanagawa (JP); Taku Kodama, Kanagawa (JP); Ikuko Yamashiro, Kanagawa (JP); Akira Takahashi, Kanagawa (JP); Takanori Yano, Kanagawa (JP); Takashi Maki, Kanagawa (JP); Takeshi Koyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 974 days.

(21) Appl. No.: 10/753,011

(22) Filed: Jan. 6, 2004

(65) Prior Publication Data
US 2004/0202372 A1 Oct. 14, 2004

(30) Foreign Application Priority Data
Jan. 6, 2003 (JP) .............................. 2003-000309

(51) Int. Cl.
*G06K 9/36* (2006.01)
*G06K 9/46* (2006.01)

(52) U.S. Cl. ....................................... 382/233; 382/240
(58) Field of Classification Search ........................ None
See application file for complete search history.

(56) References Cited

U.S. PATENT DOCUMENTS

| | | | | |
|---|---|---|---|---|
| 6,072,909 A * | 6/2000 | Yokose et al. | ............... | 382/247 |
| 6,314,234 B1 * | 11/2001 | Kawamura et al. | ............ | 386/95 |
| 6,587,508 B1 * | 7/2003 | Hanamura et al. | ..... | 375/240.24 |
| 6,674,480 B2 * | 1/2004 | Nakazawa | ................... | 348/459 |
| 6,741,367 B1 * | 5/2004 | Watanabe | ................... | 358/1.15 |
| 6,901,109 B2 * | 5/2005 | Hanamura et al. | ..... | 375/240.03 |
| 6,912,253 B1 * | 6/2005 | Li et al. | ................. | 375/240.12 |
| 6,985,632 B2 * | 1/2006 | Sato et al. | ................... | 382/240 |
| 7,006,575 B2 * | 2/2006 | Yamaguchi et al. | .... | 375/240.26 |
| 7,020,209 B1 * | 3/2006 | Okumura | .................... | 375/253 |
| 7,046,853 B2 * | 5/2006 | Okada | ........................ | 382/233 |

FOREIGN PATENT DOCUMENTS

JP 2000-261811 9/2000

(Continued)

OTHER PUBLICATIONS ("Motion-JPEG2000 standardization and target market", Fukuhara, T.; Katoh, K.; Kimura, S.; Hosaka, K.; Leung, A., Image Processing, 2000. Proceedings. 2000 International Conference on, vol. 2, Sep. 10-13, 2000 pp. 57-60.*

(Continued)

*Primary Examiner*—Wenpeng Chen
*Assistant Examiner*—Yuzhen Ge
(74) *Attorney, Agent, or Firm*—Blakely, Sokoloff, Taylor & Zafman LLP

(57) ABSTRACT

An image processing apparatus for reproducing a moving image from its encoded data is disclosed. The apparatus includes a decoding unit to decode the encoded data, and a control unit to control the decoding by the decoding unit. The control unit inhibits image reproduction by partial decoding in the decoding unit with respect to the encoded data of a moving image having scalability.

6 Claims, 11 Drawing Sheets

FOREIGN PATENT DOCUMENTS

JP  2002-010216  1/2002

OTHER PUBLICATIONS

Fujiwara, Hiroshi, ed. "Textbook of Latest MPEG," ASCII Press, Jul. 1, 2002 pp. 88-129 (including cover and table of contents).

Nomizu, Yasuyuki, "Next-Generation Image Coding Method JPEG2000," Triceps, Feb. 13, 2001, pp. 9-31 amd 46-127.

Japanese Notice of Rejection of Japanese Patent Application No. 2003-000309; the date of issue: May 16, 2007, (2 page).

* cited by examiner

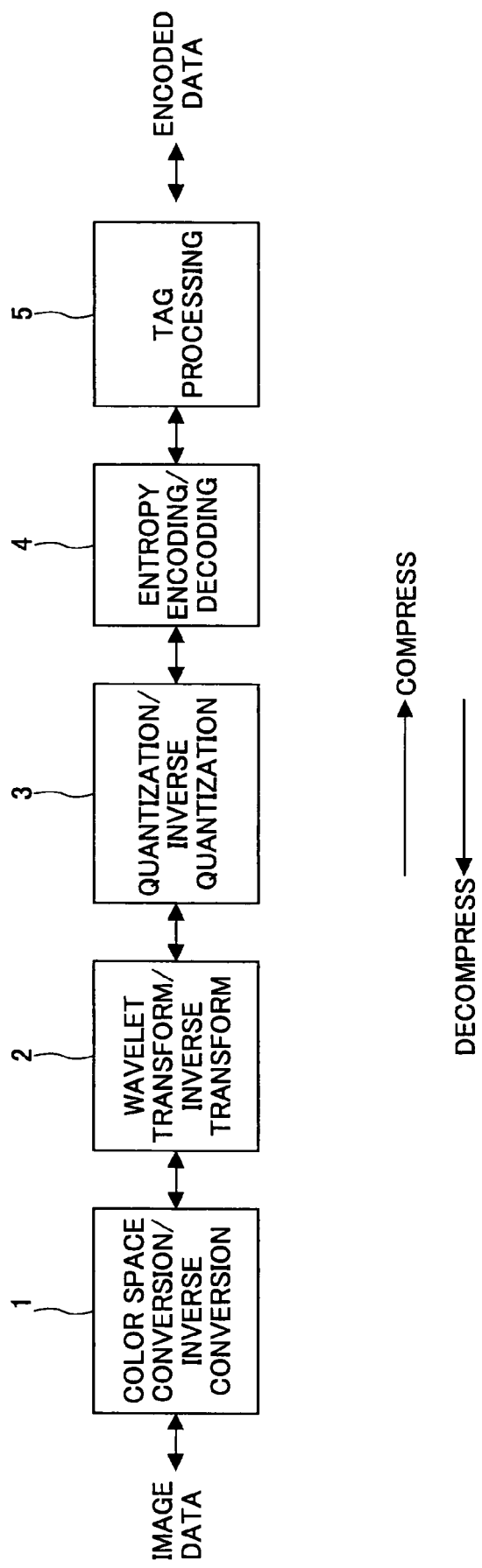

DECOMPOSITION LEVEL 0

DECOMPOSITION LEVEL 1

DECOMPOSITION LEVEL 2

DECOMPOSITION LEVEL 3

IMAGE PROCESSING APPARATUS AND METHOD FOR SCALABLE ENCODED IMAGE DATA

The present application claims priority to the corresponding Japanese Application No. 2003-000309, filed on Jan. 6, 2003, the entire contents of which are hereby incorporated by reference.

BACKGROUND OF THE INVENTION

1. Field of the Invention

The present invention relates generally to a technique for reproducing a moving image from its encoded data, and more particularly to an image processing method and apparatus for reproducing a moving image from encoded data having scalability.

2. Description of the Related Art

Generally, an image is encoded (compressed) prior to its recording or transmission. As an encoding method, JPEG is widely used for still images and MPEG for moving images (see, for instance, "Textbook of Latest MPEG," by Hiroshi Fujiwara [editor], ASCII Press, Jul. 1, 2002).

The use of streaming of moving images via a network such as the Internet is increasing these days. Through the streaming, however, a receiving end is sometimes prevented from receiving the entire code of a frame within a predetermined period of time due to heavy traffic or a failure in a communication channel. In the case of an MPEG moving image, the encoded data of each frame has no scalability. Therefore, in the case of 30 frames per second, if the reception and decoding of the entire code of a frame is not completed within 1/30 second, for instance, the frame is dropped. The MPEG moving image includes independently encoded frames and frames encoded by interframe prediction. If any of the independently encoded frames is dropped, a frame using the dropped frame for interframe prediction may also be dropped. In this case, the smoothness of the motion of the moving image is considerably damaged. In the case of reproducing a moving image while reading its encoded data from a local image source, the same sort of frame dropping also occurs to a frame whose encoded data fails to be decoded within a predetermined period of time.

In MPEG, it is also possible to transmit each frame in separate basic and high-order layers. In this case, it is possible to prevent a frame whose high-order layer cannot be received from being dropped by decoding only its basic layer. The image quality of the frame, however, is considerably degraded ("Textbook of Latest MPEG").

As coding methods to replace MPEG and JPEG, JPEG2000 (ISO/IEC FCD 15444-1) and its extended method, Motion-JPEG2000 (ISO/IEC FCD 15444-3), have attracted attention (see, for instance, "Next-Generation Image Coding Method JPEG2000," by Yasuyuki Nomizu, Triceps, Feb. 13, 2001). According to Motion-JPEG2000, a plurality of temporally successive still images is treated as the individual frames of a moving image. Each frame is encoded independent of its preceding and succeeding frames by the JPEG2000 algorithm. Accordingly, each frame of the Motion-JPEG2000 moving image is treatable in the same manner as a still image encoded by JPEG2000.

Data encoded by JPEG2000 has scalability, as is described in detail below. Encoded data of an LRCP progression, for instance, has image quality scalability such that image quality can be controlled with the same resolution. Accordingly, by decoding the encoded data successively from the MLB (most significant bit) layer, an image can be reproduced even if the decoding is prevented from reaching the LSB (least significant bit) layer. That is, even if all the code is not decoded, the image can be reproduced by decoding part of the code (this decoding is referred to as partial decoding in this specification) although its image quality is degraded.

It is also possible to provide scalability to the encoded data of each frame of a Motion-JPEG2000 moving image, so that an image can be reproduced by the partial decoding of each frame. Accordingly, in a streaming operation where, for instance, a transmitting end transmits code of an LRCP progression successively from the MSB layer, and a receiving end may reproduce an image by performing partial decoding on a frame that cannot have the code of all its layers received and decoded within a predetermined period of time. In this manner, frame dropping is avoidable. The frame reproduced by partial decoding, however, has lower image quality than a frame reproduced by having its entire code decoded (or full decoding). A moving image including such a frame of low image quality may provide a sense of strong discomfort. That is, in some cases, such a sense of discomfort may be reduced by dropping the frame of low image quality. Motion smoothness may be damaged by frame dropping. However, in the case of a Motion-JPEG2000 moving image, where each frame is encoded independently, even if a frame of low image quality is dropped, there is no need to drop even its preceding and succeeding frames. Therefore, the reproduced moving image is little affected by the dropping of the frame.

SUMMARY OF THE INVENTION

An image processing apparatus and method are described. In one embodiment, an image processing apparatus for reproducing a moving image from encoded data thereof comprises a decoding unit to decode the encoded data and a control unit to control the decoding by the decoding unit. The control unit inhibits image reproduction by partial decoding in the decoding unit with respect to encoded data of a moving image having scalability.

BRIEF DESCRIPTION OF THE DRAWINGS

Other embodiments, features and advantages of the present invention will become more apparent from the following detailed description when read in conjunction with the accompanying drawings, in which:

FIG. 1 is a schematic block diagram for illustrating the basic encoding (compression) and decoding (decompression) algorithm of JPEG2000;

DETAILED DESCRIPTION OF THE PREFERRED EMBODIMENTS

Figure 2A:
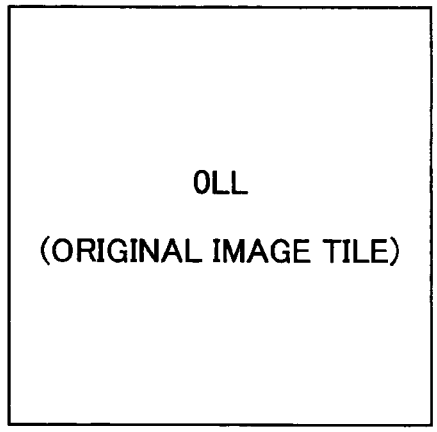
FIGS. 2A through 2D are diagrams for illustrating wavelet transform.

Accordingly, embodiments of the present invention include an image processing method and apparatus in which the above-described disadvantage is eliminated.

More specific embodiments of the present invention comprise an image processing method and apparatus that can avoid the mixing in of a frame of low image quality due to partial decoding in the case of reproducing a Motion-JPEG2000 moving image with scalability.

Although a frame reproduced by partial decoding has low image quality, it depends on the preference of a viewer of the moving image or the contents of the moving image whether the degradation of the image quality of the moving image is tolerable. Further, depending on the preference of the viewer of the moving image or the contents of the moving image, motion smoothness may be preferred even if a sense of discomfort (degraded image quality) remains to some extent.

Accordingly, other more specific embodiments of the present invention comprise an image processing method and apparatus that can control whether to reproduce or drop a frame whose entire code is not decodable in the case of reproducing a Motion-JPEG2000 moving image with scalability.

One or more of the above embodiments of the present invention include an image processing apparatus for reproducing a moving image from encoded data thereof, where the apparatus includes: a decoding unit to decode the encoded data; and a control unit to control the decoding by the decoding unit, and where the control unit inhibits image reproduction by partial decoding in the decoding unit with respect to encoded data of a moving image having scalability.

One or more of the above embodiments of the present invention include an image processing apparatus for reproducing a moving image from encoded data thereof, where the apparatus includes: a decoding unit to decode the encoded data; and a control unit to control the decoding by the decoding unit With respect to encoded data of a moving image having scalability, the control unit monitors a degree of progress of entropy decoding of a frame of the moving image by the decoding unit. The control unit causes the decoding unit to reproduce an image of the frame if the degree of progress of the entropy decoding of the frame has reached a reference within a predetermined period of time and inhibits the decoding unit from reproducing the image of the frame if the degree of progress of the entropy decoding of the frame is prevented from reaching the reference within the predetermined period of time.

One or more of the above embodiments of the present invention includes an image processing method for reproducing a moving image from encoded data thereof, where the method includes: (a) decoding encoded data; and (b) inhibiting image reproduction by partial decoding in the step (a) with respect to encoded data of a moving image having scalability.

One or more of the above embodiments of the present invention include an image processing method for reproducing a moving image from encoded data thereof, where the method includes: (a) decoding the encoded data; and (b) with respect to encoded data of a moving image having scalability, monitoring a degree of progress of entropy decoding in operation (a), and inhibiting an image of a frame from being reproduced if the degree of progress of the entropy decoding of the frame is prevented from reaching a reference within a predetermined period of time.

According to the above-described image processing apparatuses and methods, in the case of reproducing a moving image from encoded data having image quality or resolution scalability, frame reproduction by partial decoding may be inhibited so that any frame that cannot have its entire code decoded is dropped. As a result, a sense of discomfort due to the inclusion or "mixing in" of a frame of low quality image can be eliminated. A moving image each of which frames is encoded independently, such as a Motion-JPEG2000 moving image, is little affected by such frame dropping so as to be prevented from being unnatural. Depending on the preference of a user or the contents of a moving image, restriction on frame reproduction by partial decoding may be relaxed so as to reproduce a moving image of smooth motion with few dropped frames, or may be tightened so as to reproduce a moving image with little sense of discomfort even at the sacrifice of some motion smoothness.

One or more of the above embodiments of the present invention include a computer-readable recording medium on which a program for causing a computer to execute an image processing method according to one embodiment of the present invention is recorded.

One or more of the above embodiments of the present invention are further achieved by a program for causing a computer to execute an image processing method according to one embodiment of the present invention.

Prior to the description of an embodiment of the present invention, a description is given below of the outlines of JPEG2000 and Motion-JPEG2000 to the extent necessary for the understanding thereof. According to Motion-JPEG2000, each of a plurality of successive still images is treated as a frame of a moving image, and each frame is encoded independently by the JPEG2000 algorithm. The difference between Motion-JPEG2000 and JPEG2000 consists in their file formats.

FIG. 1 is a schematic block diagram for illustrating the basic encoding (compression) and decoding (decompression) algorithm of JPEG2000.

A description is given of encoding. Image data to be processed is divided into non-overlapping rectangular regions called tiles component by component. In each component, the image data is processed tile by tile. The entire image may be processed as a single tile (without being divided into tiles).

Each tile image of each component is subjected to color space conversion in a color space conversion and inverse conversion unit 1 so that the tile image is converted from RGB or CMY data into YCrCb data in order to increase the rate of compression. The color space conversion is omittable.

The tile image after the color space conversion is subjected to two-dimensional wavelet transform (discrete wavelet transform) and decomposed into a plurality of sub-bands by a wavelet transform and inverse transform unit 2.

FIGS. 2A through 2D are diagrams for illustrating wavelet transform when the number of decomposition levels is three.

Figure 2B:
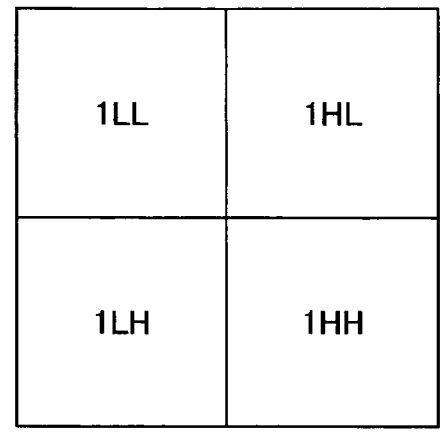
Figure 2C:
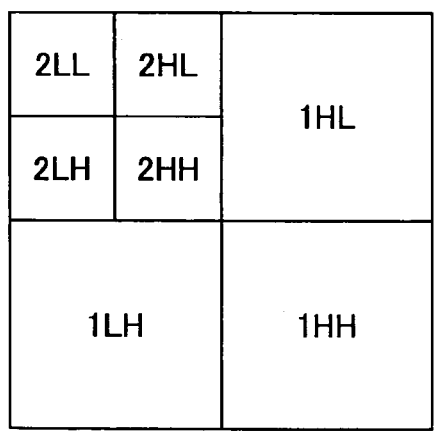
Figure 2D:
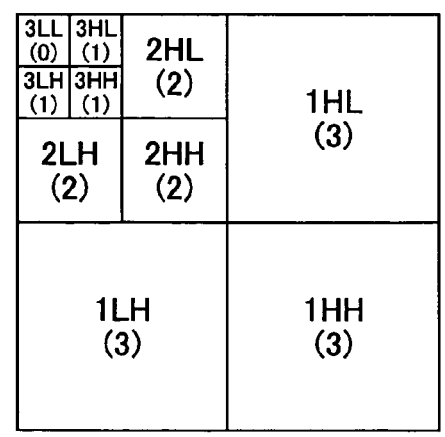

A tile image shown in FIG. 2A (Decomposition Level 0) is subjected to two-dimensional wavelet transform, and is divided into 1LL, 1HL, 1LH, and 1HH sub-bands as shown in FIG. 2B. The coefficients of the 1LL sub-band are subjected to two-dimensional wavelet transform, and are divided into 2LL, 2HL, 2LH, and 2HH sub-bands as shown in FIG. 2C. The coefficients of the 2LL sub-band are subjected to two-dimensional wavelet transform, and are divided into 3LL, 3HL, 3LH, and 3HH sub-bands as shown in FIG. 2D. The relationship between decomposition level and resolution level is shown in FIG. 2D, where a parenthesized number in each sub-band indicates the resolution level.

The wavelet coefficients obtained by the recursive dividing (octave dividing) of a low-frequency component (the LL sub-band coefficients) are quantized sub-band by sub-band by a quantization and inverse quantization unit 3. According to JPEG2000, both of reversible coding (lossless coding) and irreversible coding (lossy coding) are performable. In the case of reversible coding, the quantization step size is always one, and no substantial quantization is performed at this stage.

The coefficients of each sub-band after the quantization are subjected to entropy encoding in an entropy encoding and decoding unit 4. The entropy encoding employs a block-based bit plane coding method called EBCOT (embedded block coding with optimized truncation) including block division, coefficient modeling, and binary arithmetic coding. The bit planes of the coefficients of each sub-band after the quantization are encoded from the MSB plane to the LSB plane in units of blocks referred to as code blocks.

In a tag processing unit 5, the codes of the code blocks generated in the entropy encoding and decoding unit 4 are collected so that packets are created. Then, the packets are arranged according to a progression order, and have necessary tag information added thereto. As a result, encoded data of a predetermined format is created. According to JPEG2000, five types of progression orders are defined by the combinations of resolution level, position (precinct), layer, and component (color component) with respect to code order control.

Figure 3:
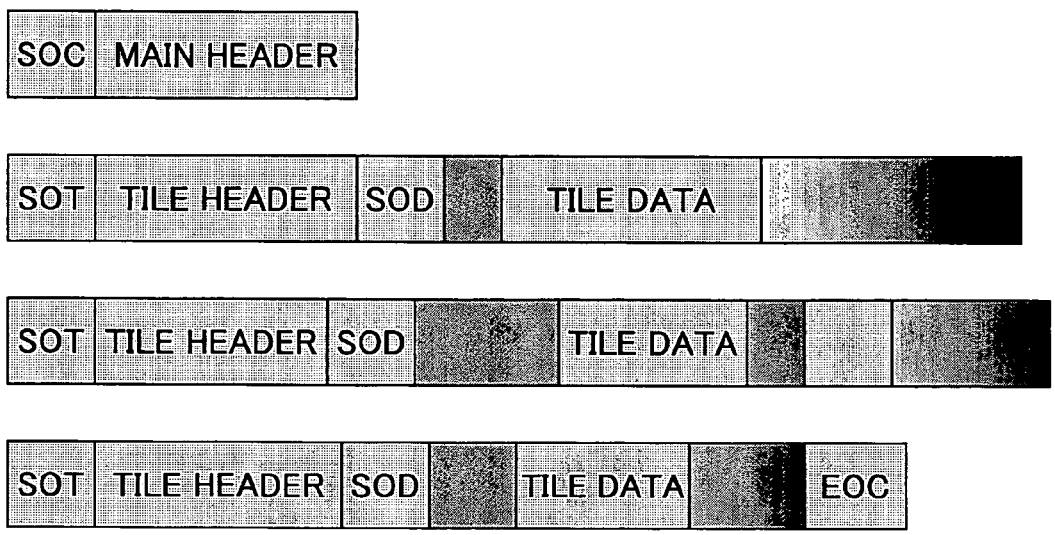
FIG. 3 is a format diagram of encoded data according to JPEG2000.

FIG. 3 is a diagram showing a format of JPEG2000 encoded data thus generated. Referring to FIG. 3, the encoded data starts with a tag called an SOC marker marking the start of the encoded data. The SOC marker is followed by tag information called a main header describing encoding and quantization parameters. The main header is followed by the code data of each tile. The code data of each tile starts with a tag referred to as an SOT marker, and includes tag information called a tile header, a tag called an SOD marker, and tile data whose contents are the codestream of the tile. A tag called an EOC marker marking an end is placed after the last tile data.

Figure 4:
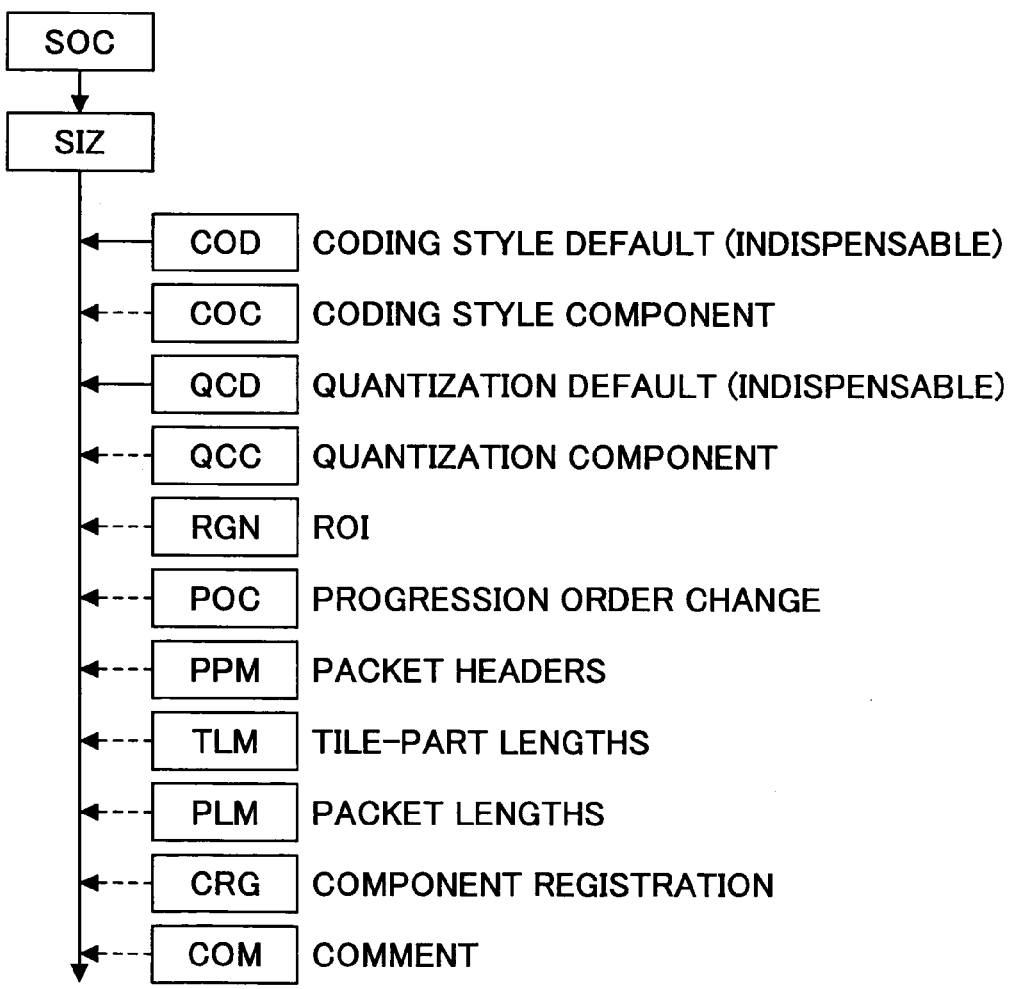
FIG. 4 is a diagram showing a configuration of a main header.

FIG. 4 is a diagram showing a configuration of the main header. Of the marker segments, SIZ, COD, and QCD are indispensable, but the others are optional.

Decoding is performed in the order opposite to that of encoding. Encoded data is decomposed into the codestreams of the tiles of each component. The codestreams are subjected to entropy decoding by the entropy encoding and decoding unit 4. The decoded wavelet coefficients are subjected to inverse quantization in the quantization and inverse quantization unit 3 and to two-dimensional inverse wavelet transform in the wavelet transform and inverse transform unit 2 so that each tile image of each component is reproduced. Each tile image of each component is subjected to inverse color conversion in the color space conversion and inverse conversion unit 1 so as to return to a tile image formed of the components such as R, G, and B.

A description is given next of precinct, code block, packet, and layer in JPEG2000. There is a relationship "image≧tile≧sub-band≧precinct≧code block" in terms of size.

Figure 5:
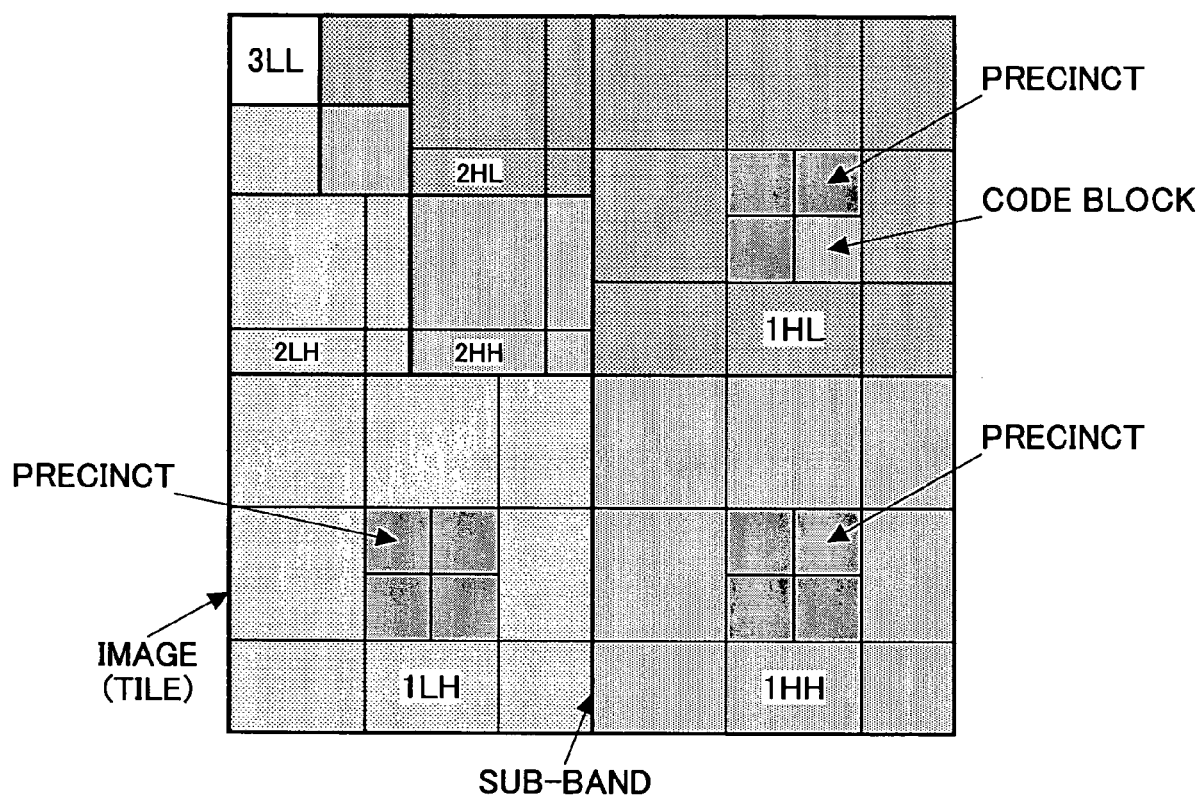
FIG. 5 is a diagram showing a precinct and code blocks.

A precinct is a rectangular region of a sub-band. A set of three regions spatially located at the same position in the HL, LH, and HH sub-bands, respectively, of the same decomposition level is treated as a precinct. In the LL sub-band, however, a single region is treated as a precinct. A precinct may have the same size as a sub-band. A precinct is divided into rectangular regions called code blocks. FIG. 5 is a diagram showing a precinct and code blocks at Decomposition Level 1. Referring to FIG. 5, a set of three regions spatially located at the same position, denoted as PRECINCT, is treated as a precinct.

Part of the code of each code block of a precinct (for instance, the code of the MSB bit plane and the next two bit planes of the code) is extracted, and the extracted parts of the codes of the code blocks are collected into a packet. A packet may be formed of empty code. The codes of the code blocks are collected so that packets are created. The packets are arranged according to a desired progression order so that encoded data is created. Referring to FIG. 3, in each tile, a part subsequent to SOD is a collection of packets.

When the packets of all the precincts (that is, all the code blocks or all the sub-bands) are collected, part of the code of the entire image (for instance, the code of the MSB bit plane and the next two bit planes of the wavelet coefficients of the entire image) is created as a layer. Accordingly, the more the number of layers to be decoded, the better the image quality of a reproduced image. That is, the layer can be considered as a unit of image quality. When all the layers are collected, the code of all the bit planes of the entire image is created.

The five progression orders defined according to JPEG 2000 are LRCP, RLCP, RPCL, PCRL, and CPRL, where L is Layer, R is Resolution level, C is Component, and P is Precinct (position).

In the case of the LRCP progression, the handling of packets (the arrangement of packets at the time of encoding and the interpretation of packets in the case of decoding) is performed according to the below-described for loops nested in the order of L, R, C, and P:

```
for(layer){
    for(resolution level){
        for(component){
            for(precinct){
                arrange packets: at the time of encoding
                interpret packets: at the time of decoding
            }
        }
    }
}
```

Figure 6:
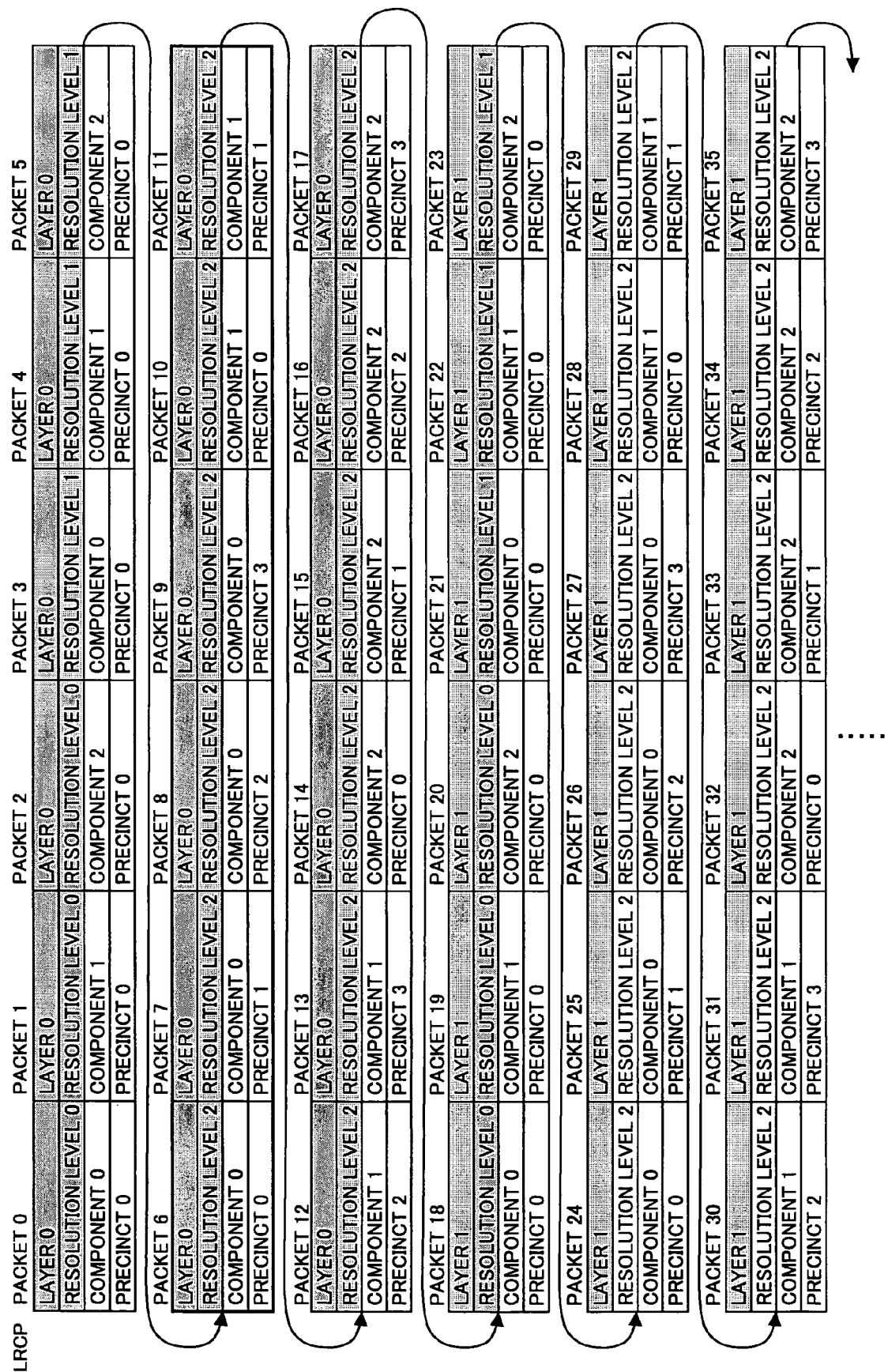
FIG. 6 is a diagram for illustrating an arrangement order and an interpretation order of packets in encoded code of an LRCP progression.

FIG. 6 shows a specific example of the handling of packets.

Encoded data obtained as a result of the LRCP progression has image quality scalability that can control image quality while maintaining the same resolution level. As described above, an image can be reproduced by decoding only the code of layers on the MSB side (that is, partial decoding) without decoding the code of all the layers. The progression order and the number of layers are written to the COD marker segment of the main header.

Partial decoding is also performable on encoded data of the RLCP or RPCL progression having spatial resolution scalability.

A description is given next of an embodiment of the present invention.

Figure 7:
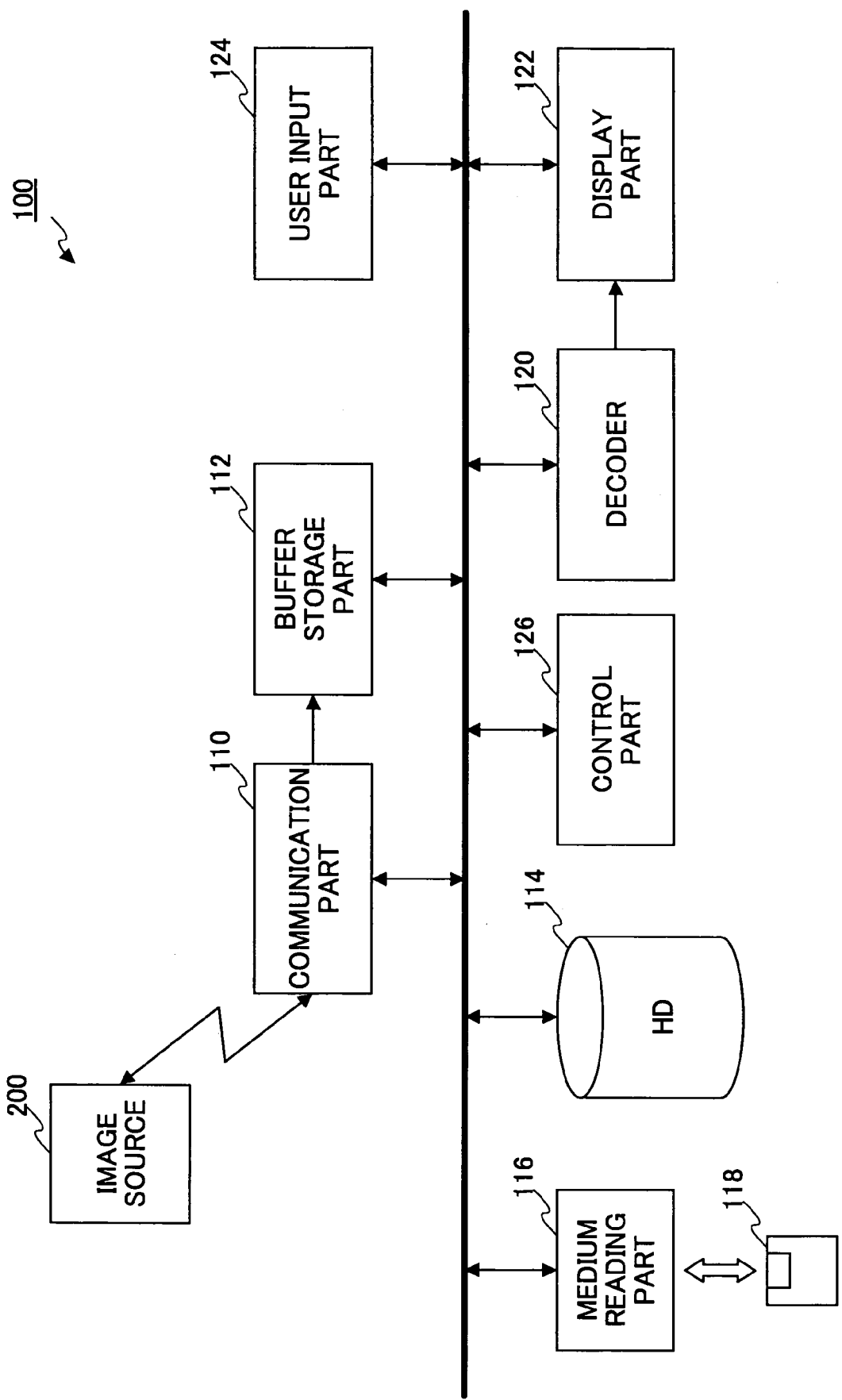
FIG. 7 is a block diagram showing an image processing apparatus according to an embodiment of the present invention.

FIG. 7 is a block diagram showing an image processing apparatus 100 according to one embodiment of the present invention. Referring to FIG. 7, the image processing apparatus 100 includes, as local image sources, a hard disk unit (HD) 114 and a medium reading unit 116 reading a recording medium 118 such as a memory card.

The image processing apparatus 100 includes a communication unit 110 for communications with a network such as the Internet or an intranet so as to be able to perform streaming of a moving image transmitted from an image source 200 (a server) on the network. In the case of streaming, encoded data received by the communication unit 110 is temporarily stored in a buffer storage unit 112, and is processed successively. The hard disk unit 114 is also used as a buffer storage area as required.

The image processing apparatus 100 further includes a decoder 120 for decoding encoded data, a user input part 124 for a user to specify a reference (described below), a display unit 122 for displaying an image, and a control unit 126 for controlling the decoding operation of the decoder 120 as well as the operations of the other units of the image processing apparatus 100. The control unit 126 controls whether to inhibit or authorize image reproduction by partial decoding in the decoder 120.

Although not graphically represented, the image processing apparatus 100 is also realizable by a program, using a multi-purpose computer such as a personal computer. In this case, the decoder 120 may be provided as hardware or realized by a program. Naturally, a mode using such a computer is included in the present invention. Further, a program therefor and a recording (storage) medium on which the program is recorded are also included in the present invention.

Figure 8:
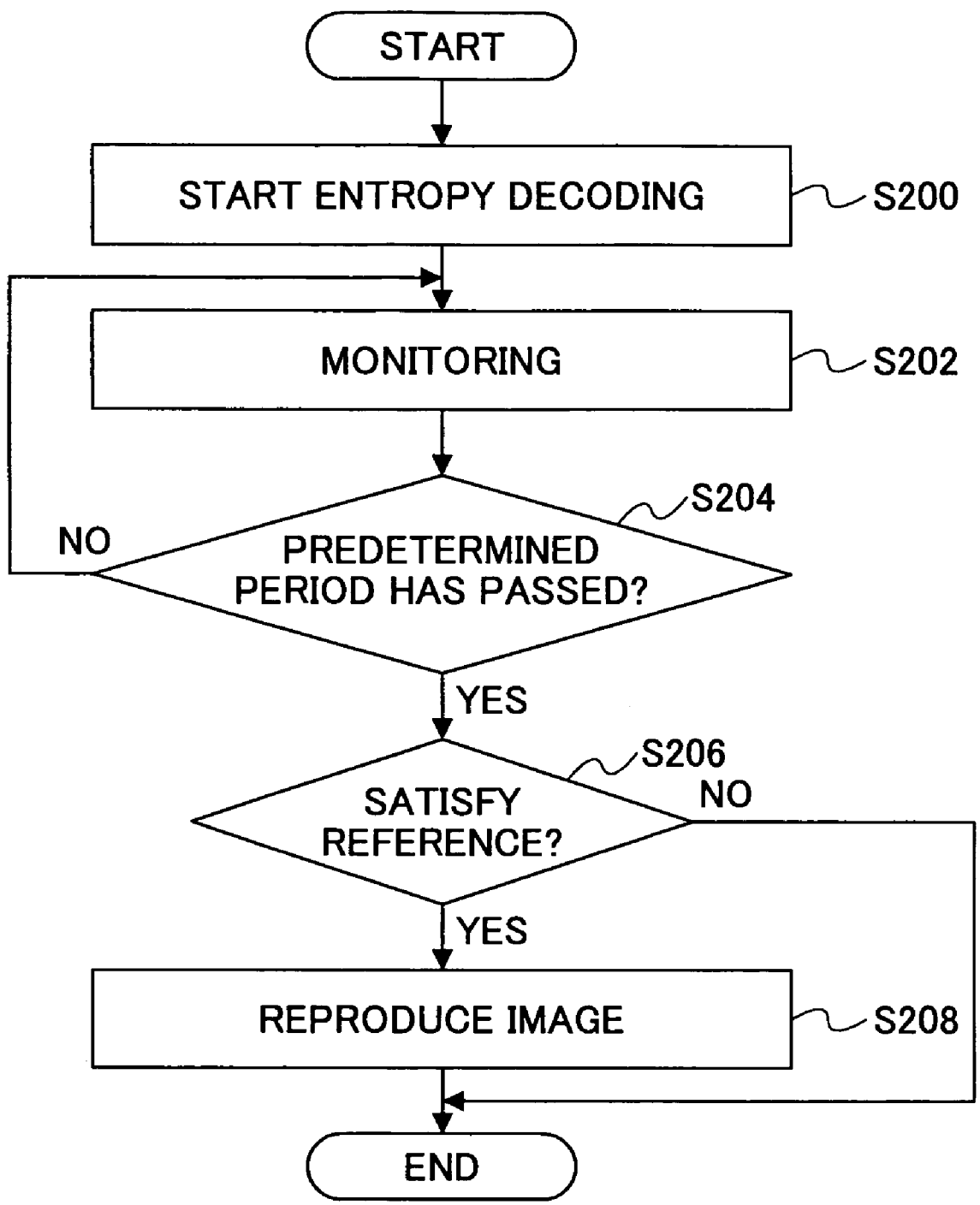
FIG. 8 is a flowchart for illustrating the operation of reproducing each frame of a moving image having scalability according to an embodiment of the present invention.
Figure 9:
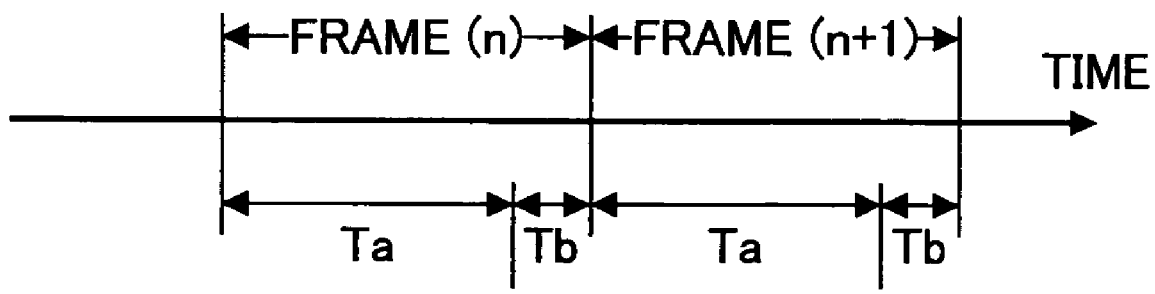
FIG. 9 is a timing chart for illustrating the operation of reproducing the moving image according to an embodiment of the present invention.

Next, a description is given of the operation of: inputting the encoded data of a Motion-JPEG2000 moving image having scalability (for instance, encoded data of the LRCP progression) from the local image source (114 or 116) or the remote image source 200; decoding the input encoded data; reproducing the moving image; and displaying the moving image on the display part 122. FIGS. 8 and 9 are a flowchart and a timing chart, respectively, for illustrating the operation.

Referring to FIG. 8, in step S200, the control unit 126 causes the decoder 120 to start, at the start of the period of a current frame, to perform entropy decoding on the encoded data of the next (subsequent) frame. In step S202, the control unit 126 monitors the progress of the entropy decoding until a predetermined period of time passes since the start of the entropy decoding. In step S204, the control unit 126 determines whether the predetermined period of time has passed. If the predetermined period of time has passed (that is, "YES" in step S204), in step S206, the control unit 126 determines whether the degree of progress of the entropy decoding at that point reaches a reference specified by a user or a default reference.

If the degree of progress reaches the reference (that is, "YES" in step S206), in step S208, the control unit 126 causes the decoder 120 to perform processing for image reproduction, that is, inverse quantization, inverse wavelet transform, and inverse color space conversion, using the results of the entropy decoding so far, and output the reproduced image data to the display unit 122. As described below, image reproduction by partial decoding is completely inhibited or authorized with restriction, depending on a reference to be set.

If the degree of progress of the entropy decoding does not reach the reference (that is, "NO" in step S206), the control unit 126 inhibits the decoder 120 from performing the inverse quantization and the following operations. Accordingly, the subsequent frame is prevented from being reproduced and output, and the image of the current frame continues to be displayed on the display unit 122 in the next frame period. That is, image reproduction by partial decoding is inhibited, so that the subsequent frame is dropped.

Referring to FIG. 9, the entropy decoding of a subsequent frame (n+1) is performed within a predetermined period Ta from the start of the period of a current frame (n). The entropy decoding of the entire code of the subsequent frame (n+1) may be completed before the predetermined period Ta passes. If the degree of progress of the entropy decoding reaches a reference within the predetermined period Ta, the inverse quantization and the subsequent decoding operations are performed on the entropy-decoded data of the subsequent frame (n+1) within the remaining period Tb until the start of the period of the subsequent frame (n+1). As a result, an image is reproduced, and data on the image is output to the display unit 122 so that the image is displayed thereon during the period of the subsequent frame (n+1). If the degree of progress of the entropy decoding does not reach the reference, the inverse quantization and the subsequent decoding operations are not performed in the period Tb, so that the subsequent frame (n+1) is dropped and the same image of the current frame continues to be displayed during the period of the subsequent frame (n+1).

The reference for the degree of progress of the entropy decoding may be specified by a user as, for instance, the ratio of the amount of decoded code to the amount of the entire code, the ratio of the number of decoded layers to the number of all layers (the total number of layers), or the ratio of the number of decoded resolution levels to the number of all resolution levels (the total number of resolution levels). If the reference for the degree of progress of the entropy decoding is not specified by a user, a default reference is employed.

By referring to the PLM marker segment of a main header or the PLT marker segment of a tile header, the amount of code of each layer or packet may be obtained. Therefore, it is easy to determine the ratio of the amount of decoded code to the amount of the entire code. As described above, the number of all layers is determinable from the COD marker segment of a main header. Accordingly, it is easier to determine the ratio of the number of decoded layers to the number of all layers. If encoded data is created so that each layer has the same amount of code, the ratio of the number of decoded layers is substantially identical to the ratio of the amount of decoded code to the amount of the entire code. Further, the number of resolution levels (the number of decomposition levels) is determinable from the COD marker segment of a main header. Therefore, it is also easy to determine the ratio of the number of decoded resolution levels to the number of all resolution levels.

If a user desires to prevent a frame of low image quality due to partial decoding from being included in a reproduced moving image, the user can inhibit image reproduction by partial decoding by setting the reference (for instance, the ratio of the amount of decoded code to the amount of the entire code) to 100%. A user who desires to reduce frame dropping may set the reference to less than 100%. In this case, the image of a frame that reaches the reference can be reproduced even if the frame is only partially decoded.

Figure 10A:
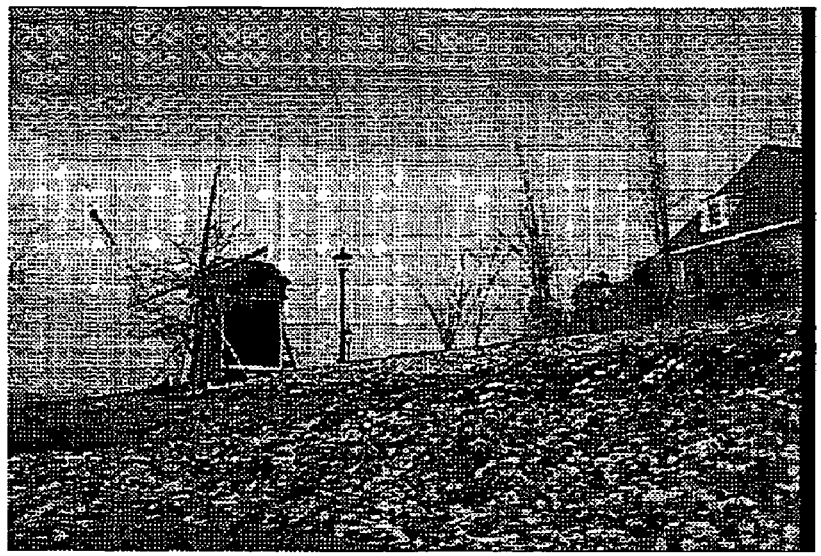
FIGS. 10A through 10C are diagrams showing reproduced images in a case where all the code of three frames of a moving image has been decoded according to an embodiment of the present invention.
Figure 10B:
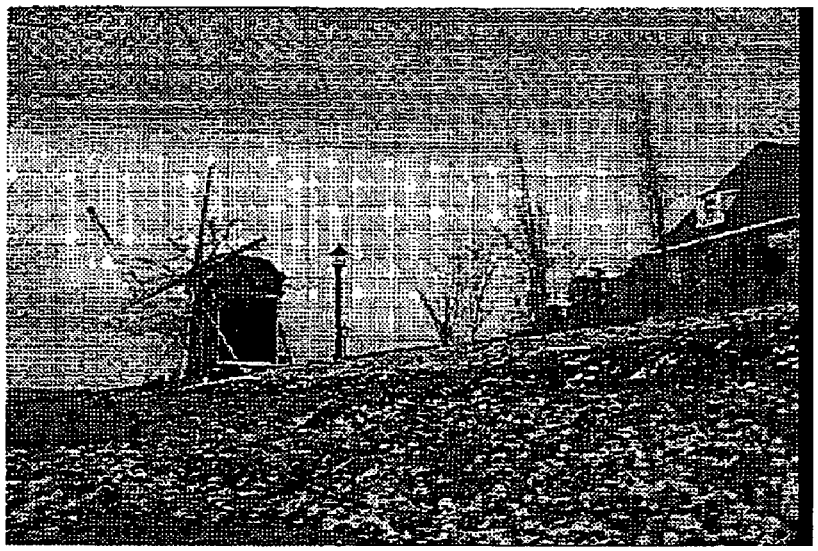
Figure 10C:
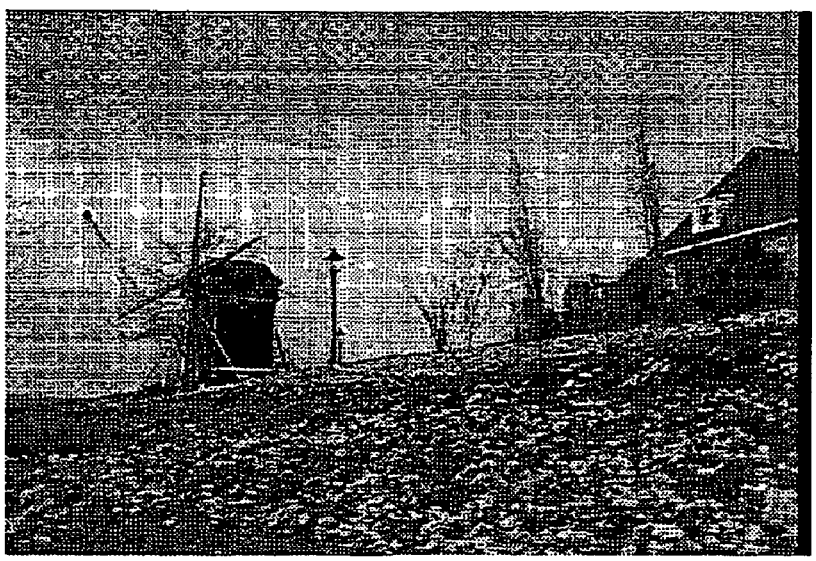
Figure 11A:
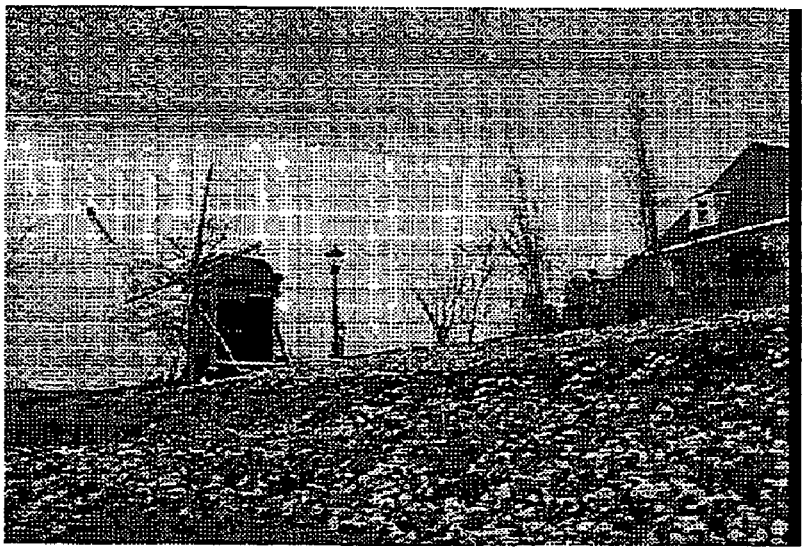
FIGS. 11A through 11C are diagrams showing reproduced images in a case where the second frame of the moving image of FIGS. 10A through 10C has only 15% of its code decoded according to an embodiment of the present invention.
Figure 11B:
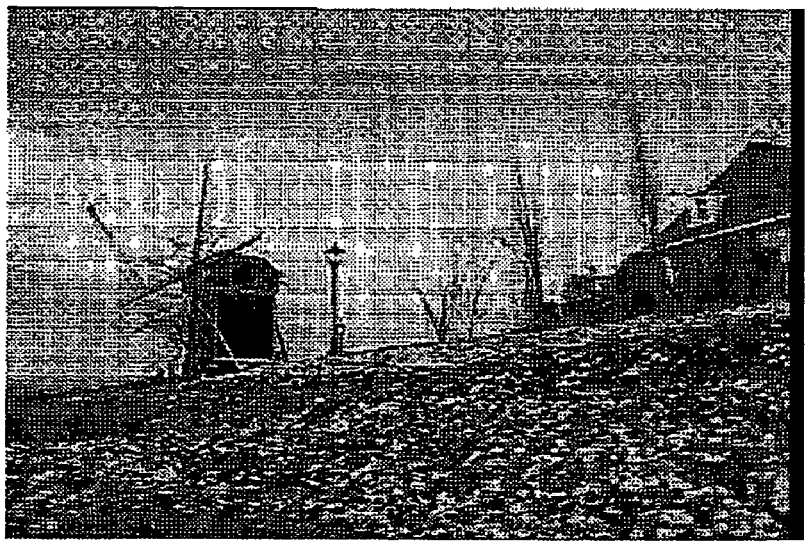
Figure 11C:
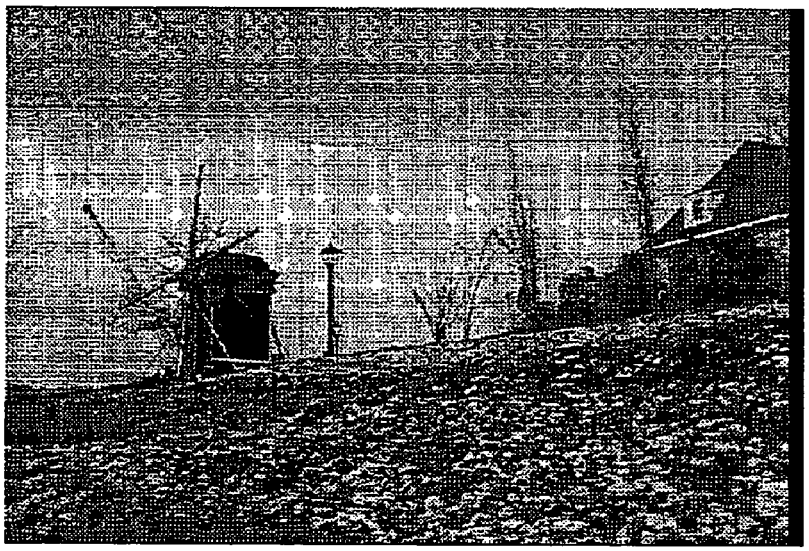
Figure 12A:
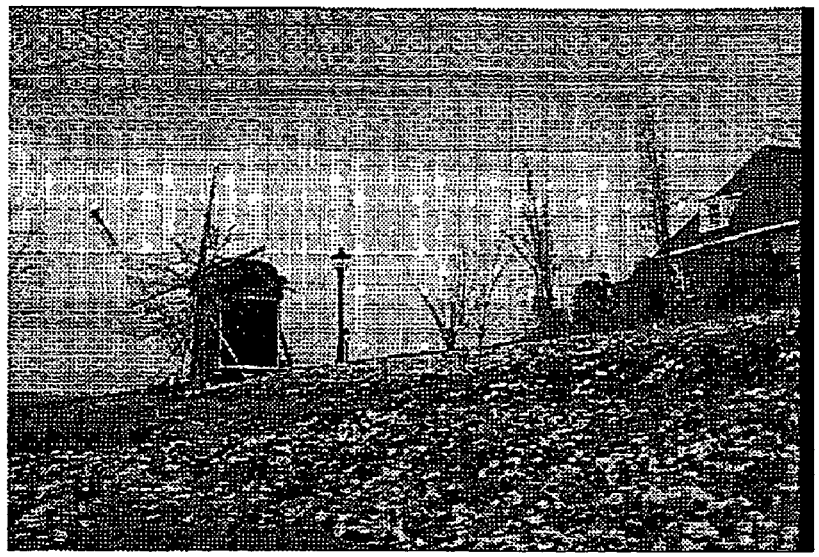
FIGS. 12A through 12C are diagrams showing reproduced images in a case where the second frame of the moving image of FIGS. 10A through 10C has only 70% of its code decoded according to an embodiment of the present invention.
Figure 12B:
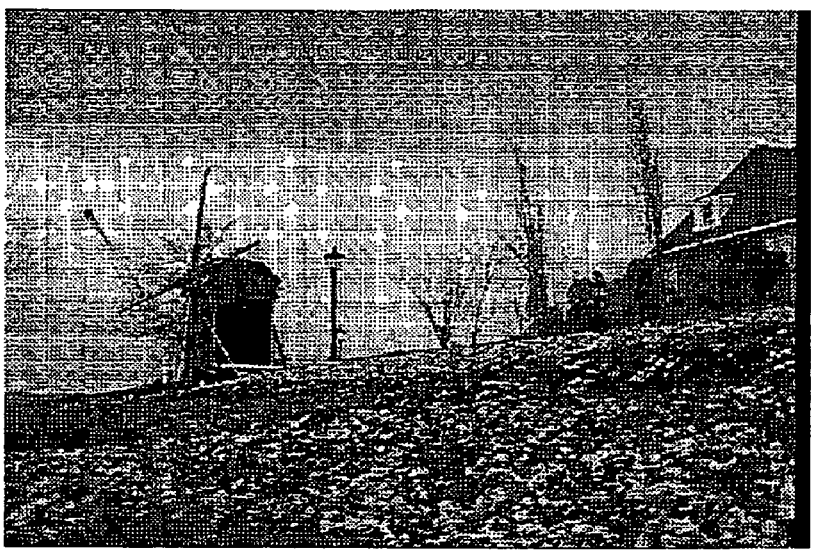
Figure 12C:
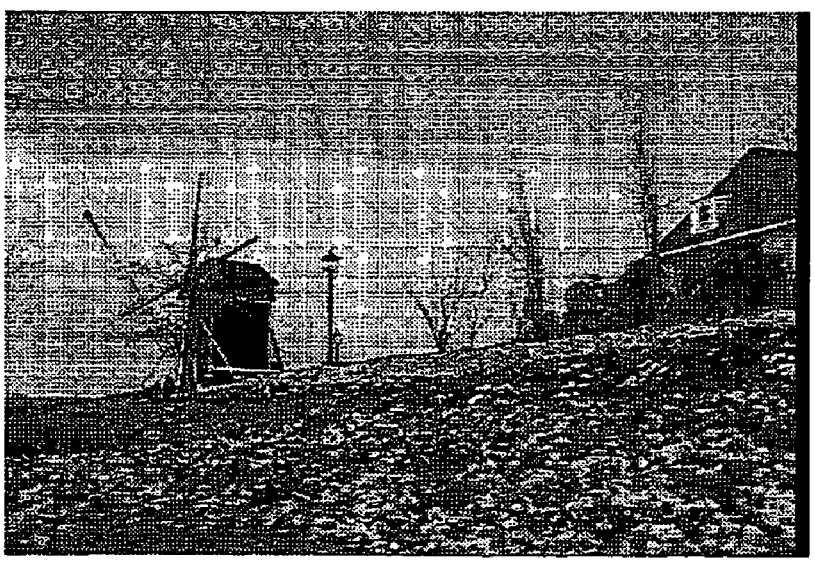

FIGS. 10A through 10C, FIGS. 11A through 11C, and FIGS. 12A through 12C show the reproduced images of three frames of the same moving image. FIGS. 10A through 10C show the case where all the code has been decoded in each of the three frames. FIGS. 11A through 11C show the case where only 15% of the code has been decoded in the second frame (FIG. 11B). FIGS. 12A through 12C show the case where only 70% of the code has been decoded in the second frame (FIG. 12B). That is, each of FIGS. 11B and 12B shows a reproduced image by partial decoding. In streaming, it is often impossible to fully decode the code within a predetermined period of time as in the cases of FIGS. 11B and 12B, due to a delay in code reception. It may occur, even in cases other than streaming, that decoding is prevented from being completed in a frame having a large amount of code.

In the case of FIGS. 11A through 11C, blurry branches attract attention in the second frame (FIG. 11B), so that a strong sense of discomfort is generated when the second frame is displayed. Accordingly, it is better to drop the second frame to make the moving image more natural. In the case of FIGS. 12A through 12C, the image quality of the second frame (FIG. 12B) is tolerable. Therefore, the displaying of the second frame as it is does not provide that much of a sense of discomfort. Accordingly, users who desire to give priority to motion smoothness may prefer to display the second frame, while others who dislike a sense of discomfort due to a variation in image quality may prefer to drop the second frame.

For instance, a user who desires to avoid including a frame whose image quality is degraded, if at all, even at the sacrifice of some motion smoothness, may drop all partially decoded frames by setting the ratio of the amount of decoded code to the amount of the entire code to 100% as the reference. In this case, the images of all the three frames are reproduced and displayed where the entire code of each frame is decodable as in the case of FIGS. 10A through 10C, while in the case of FIGS. 11A through 11C and in the case of FIGS. 12A through 12C, the second frame is dropped. A Motion-JPEG2000 moving image, in which each frame is encoded independently, is little affected by such frame dropping, and is prevented from being unnatural.

A user who prefers motion smoothness and dislikes the occurrence of frame dropping may set, for instance, the ratio of the amount of decoded code to the amount of the entire code to 70% or greater as the reference. In this case, the second frame is dropped in such a case as shown in FIGS. 11A through 11C, while the second frame is prevented from being dropped and is partially decoded in such a case as shown in FIGS. 12A through 12C.

If a user desires to limit the degradation of image quality more strictly, the user may set, for instance, the ratio of the amount of decoded code to the amount of the entire code to 80% or greater as the reference. In this case, the second frame is dropped in such cases as shown in FIGS. 11A through 11C and 12A through 12C.

Thus, depending on how the reference is selected (set), a user can reproduce a moving image of smooth motion with few dropped frames by authorizing frame reproduction by partial decoding, or can reproduce a moving image that reduces a sense of discomfort due to the degradation of the image quality of part of the frames at the sacrifice of some motion smoothness by limiting frame reproduction by partial decoding.

In the case of a moving image without scalability, where there is no allowance for partial decoding, any frame that cannot have its entire code decoded within a predetermined period of time is dropped.

It is apparent that processing for the above-described image processing method is performable by a program on a computer such as a personal computer. The program and a variety of recording (storage) media on which the program may be recorded are also included in the present invention.

Thus, the present invention is described above based on a Motion-JPEG2000 moving image. It is apparent, however, that the present invention is also applicable to a moving image coded by another coding method.

As described above, according to one embodiment of the present invention, in the case of reproducing a moving image from encoded data having image quality or resolution scalability, frame reproduction by partial decoding may be inhibited so that any frame that cannot have its entire code decoded is dropped. As a result, a sense of discomfort due to the inclusion or "mixing in" of a frame of low quality image can be eliminated. A moving image in which each frame is encoded independently, such as a Motion-JPEG2000 moving image, is little affected by such frame dropping so as to be prevented from being unnatural. Depending on the preference of a user or the contents of a moving image, restriction on frame reproduction by partial decoding may be relaxed so as to reproduce a moving image of smooth motion with few dropped frames, or may be tightened so as to reproduce a moving image with little sense of discomfort even at the sacrifice of some motion smoothness.

The present invention is not limited to the specifically disclosed embodiment, but variations and modifications may be made without departing from the scope of the present invention.

The present application is based on Japanese priority application No. 2003-000309, filed on Jan. 6, 2003, the entire contents of which are hereby incorporated by reference.

What is claimed is:

1. An image processing apparatus for reproducing a moving image from encoded data thereof, comprising:
   a decoding unit to decode the encoded data; and
   a control unit to control the decoding by the decoding unit, wherein with respect to encoded data of a moving image having scalability, the control unit monitors a degree of progress of entropy decoding of a frame of the moving image by the decoding unit, the control unit causing the decoding unit to reproduce an image of the frame if the degree of progress of the entropy decoding of the frame has reached a reference within a predetermined period of time and inhibiting the decoding unit from reproducing the image of the frame if the degree of progress of the entropy decoding of the frame is prevented from reaching the reference within the predetermined period of time, and the reference for the degree of progress of the entropy decoding comprises a ratio of an amount of code of the frame, where the code has been entropy decoded to a total amount of code of the frame.

2. The image processing apparatus as claimed in claim 1, wherein the reference for the degree of progress of the entropy decoding comprises a ratio of the number of layers of the frame where the layers have been entropy decoded, to the total number of layers of the frame.

3. The image processing apparatus as claimed in claim 1 wherein the reference for the degree of progress of the entropy decoding comprises a ratio of the number of resolution levels of the frame, where the resolution levels have been entropy decoded, to the total number of resolution levels of the frame.

4. An image processing method for reproducing a moving image from encoded data thereof, comprising:
   (a) decoding the encoded data; and
   (b) with respect to encoded data of a moving image having scalability, monitoring a degree of progress of entropy decoding the encoded data, and inhibiting an image of a frame from being reproduced if the degree of progress of the entropy decoding of the frame is prevented from reaching a reference within a predetermined period of time, wherein the reference for the degree of progress of the entropy decoding comprises a ratio of an amount of code of the frame that has been entropy decoded to a total amount of code of the frame.

5. The image processing method as claimed in claim 4, wherein the reference for the degree of progress of the entropy decoding comprises a ratio of the number of layers of the frame that has been entropy decoded to the total number of layers of the frame.

6. The image processing method as claimed in claim 4, wherein the reference for the degree of progress of the entropy decoding comprises a ratio of the number of resolution levels of the frame that has been entropy decoded to the total number of resolution levels of the frame.

* * * * *